May 5, 1931.  W. A. GUNNING  1,803,429
LENS TOOL SURFACING MACHINE
Filed Nov. 19, 1927  2 Sheets-Sheet 1

Inventor
William A. Gunning
By Harry H. Styll
Attorney

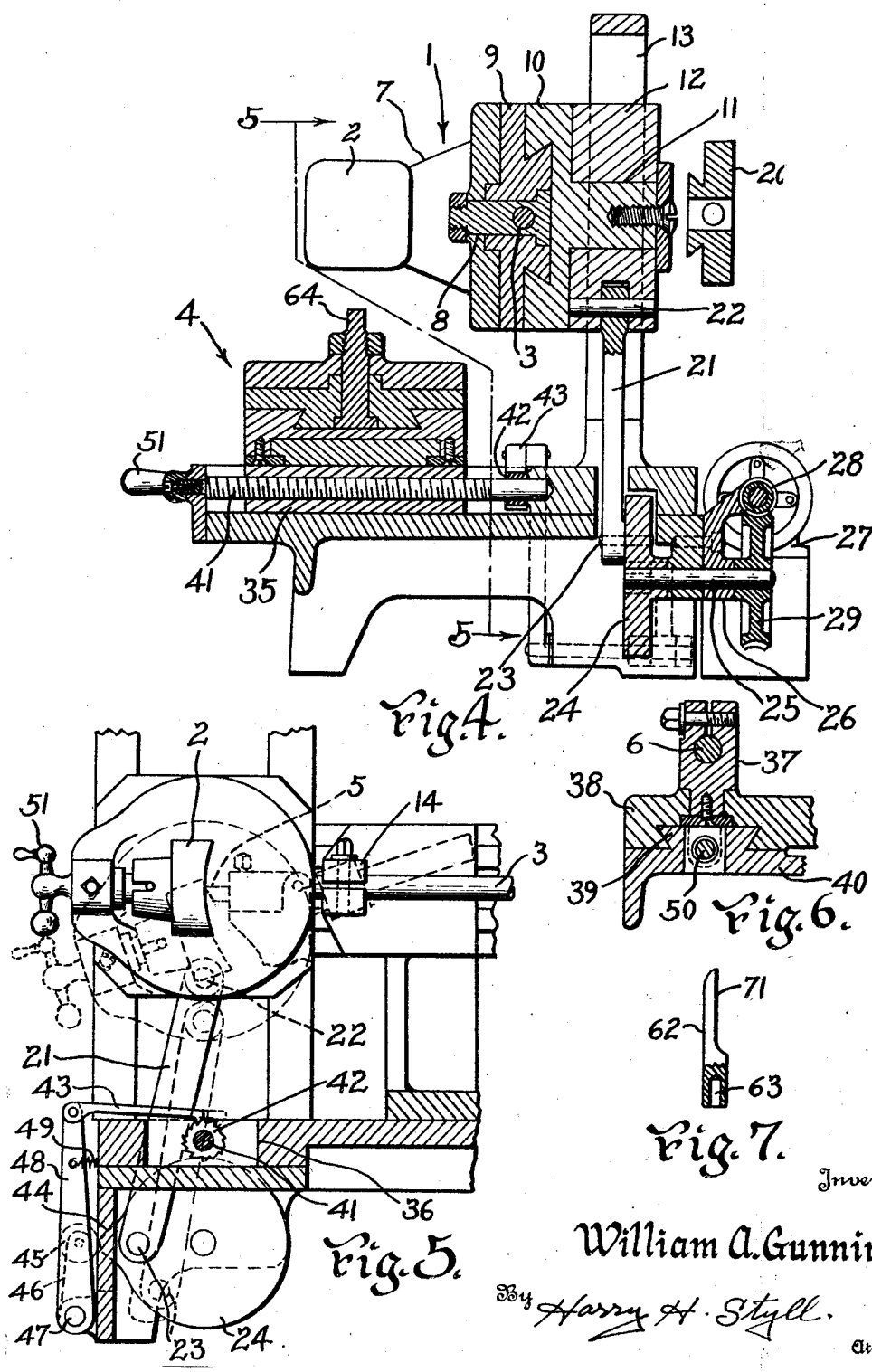

Patented May 5, 1931

1,803,429

UNITED STATES PATENT OFFICE

WILLIAM A. GUNNING, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

LENS-TOOL-SURFACING MACHINE

Application filed November 19, 1927. Serial No. 234,460.

This invention relates to improvements in an apparatus for surfacing metal and other similar objects and has particular reference to means for truing concave or convex surfacing laps or grinding tools.

The principal object of the invention is to provide improved means for truing lens surfacing laps or tools of various surface formation including single and compound curvatures, toric, cylindrical or spherical either in the concave or convex form.

Another object of the invention is to provide improved means whereby the cutting tool and work holder of the machine may be quickly adjusted or reversed to true either concave or convex surfaces having the same configuration without changing or disturbing the adjustment for the curve which is to be formed.

Another object of the invention is to greatly reduce or simplify the adjustments usual in machines of this character.

Another object of the invention is to provide means whereby the cutting feed of the machine will remain constant without regard to the curve the machine is adjusted to form.

Another object of the invention is to provide a machine wherein the same gauges are used for truing both concave and convex surfaces.

Another object of the invention is to provide a machine that is simple, durable and well adapted for the purposes for which it is designed.

Another object of the invention is to provide improved means for reducing the time and labor required in truing the surfaces of surfacing tools.

Other objects and advantages of the invention will become apparent by reference to the following specification taken in connection with the accompanying drawings, and it will be understood that I may make many modifications in the details of construction and arrangements of parts without departing from the spirit of the invention as expressed in the accompanying claims. I, therefore, do not wish to be limited to the exact details of construction and arrangements of parts shown; the preferred forms only having been shown and described by way of illustration.

Referring to the drawings:

Fig. 4 is a transverse sectional view of the machine taken on line 4—4 of Fig. 1;

Fig. 5 is a fragmentary sectional view on line 5—5 of Fig. 4 showing the drive and feed mechanism;

Fig. 6 is a detailed sectional view on line 6—6 of Fig. 1;

Fig. 7 is a view partially in section of the gauge used in setting the cutting tool.

Figures 1, 2, 3:
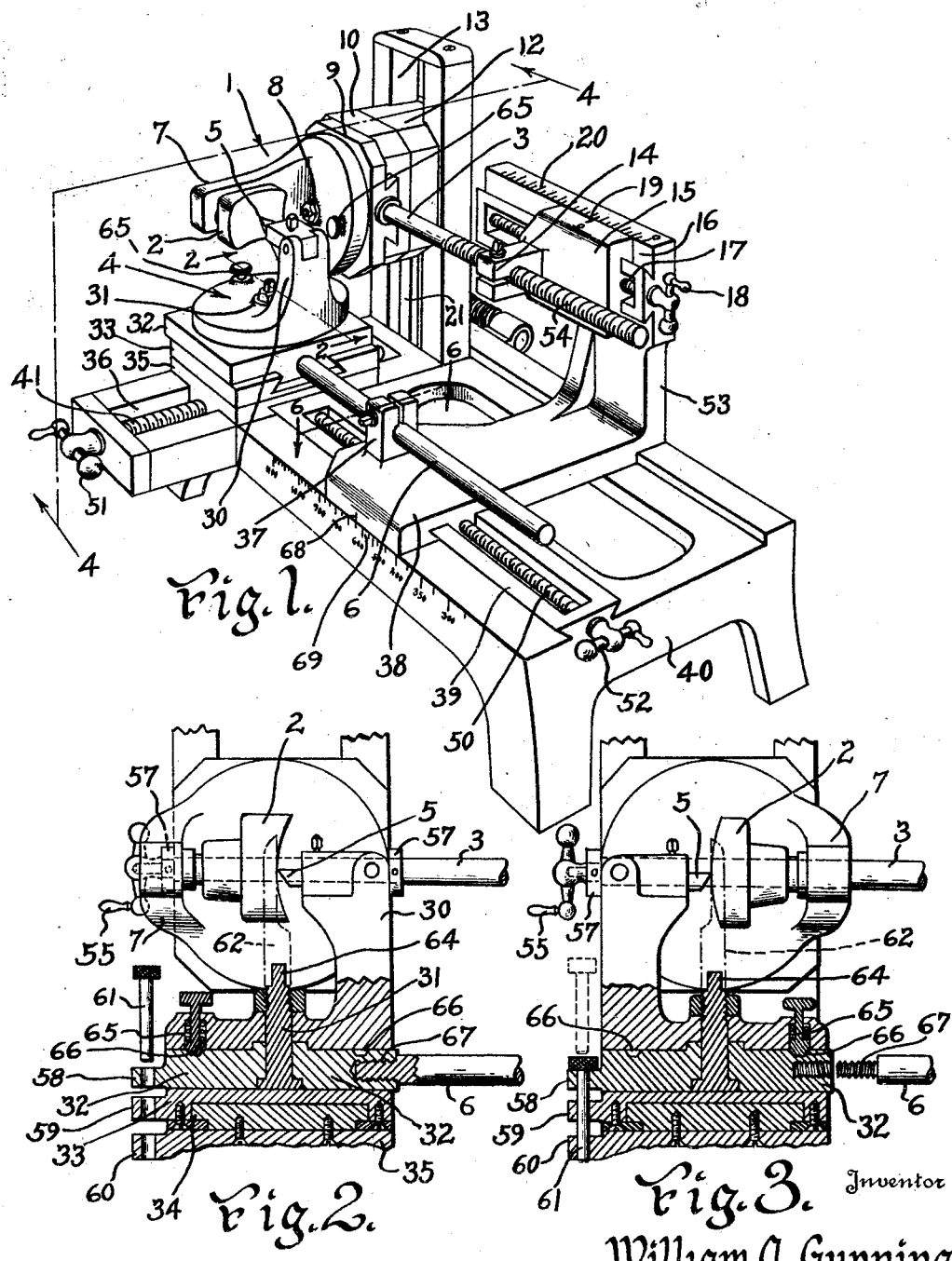
Fig. 1 is a perspective view of a machine embodying the invention.
Fig. 2 is a sectional view taken on line 2—2 of Fig. 1 showing the turrets adjusted to true a concave surface.
Fig. 3 is a similar view showing the parts adjusted to true a convex surface.

Referring to the drawings wherein similar characters of reference are employed to denote corresponding parts throughout, the invention comprises broadly a turret 1 for supporting the lap or tool 2 combined with a radius bar 3 having means to change the radius to required length for forming the curve in one meridian of the tool and a turret 4 for supporting the cutting tool 5 combined with a radius bar 6 having means to change the radius to required length and means to feed the cutting tool across the face of the tool that is being formed to form the curve in the other meridian.

The lap 2 is supported on the turret head 7 which is pivoted at 8 to the slide 9 carried by the slide way 10. The slide way 10 is also pivoted at 11 to the slide 12 mounted in the slide way 13. The slide 9 upon which the turret head 7 is pivotally mounted is connected to the radius bar 3 which is pivoted at 14 to the slide 15 mounted in the slide way 16. The slide 15 may be adjusted longitudinally of the slide way 16 by the threaded shaft 17 and hand lever 18 to determine the radius of the curve desired in one meridian of the work and the exact position may be determined by the indicator mark 19 on the slide 15 and the graduated scale 20 on the slide way 16.

The cutting stroke of the machine is obtained by the upward and downward movement of the turret head 1 in the slide way 13. This is a positive movement formed by the crank lever 21 pivotally connected at 22 to the slide 12 and at the opposite end 23 to the crank disc 24. The crank disc 24 is keyed to the shaft 25 mounted in the bearing 26 and is rotated by the motor 27 through the worm 28 and gear 29.

As the turret 1 is reciprocated in the slide way 13 the radius bar 3 which is pivotally secured at 14 will cause the slide 9 to move in and out in the slide way 10 and will simultaneously cause the slide way 10 to turn about the pivot 11 to cause the lap 2 to move in an arc equal to a radius taken from the center of the pivot 14 to the point of the cutting tool 5. The cutting tool 5 is fed across the face of the work during this movement and thereby removes a given amount of material from the surface of the work at each downward movement of the slide 12. This forms the curve in one meridian of the work.

The curve in the other meridian of the lap is simultaneously formed by a curve described by the cutting tool 5 as it is moved across the face of the lap 2. The cutting tool 5 is supported on the turret head 30 pivoted at 31 to the slide 32 carried by the slide way 33. The slide way 33 is pivoted at 34 to the slide 35 mounted in the slide way 36. The slide 32 is connected to the radius bar 6 which is pivotally secured at 37 to the slide 38 carried by the slide way 39 and will thereby move in and out in the slide way 33 and simultaneously turn about the pivot 34 as the cutting tool 5 is fed across the face of the work and will cause the cutting tool 5 to move in an arc equal to a radius taken from the center of the pivot 37 to the point of the cutting tool, or to the centers 8 and 31 of the turrets 1 and 4 when the turrets are locked in aligned position. The point of the cutting tool 5 is tangent with the center line of the pivot 31 for all adjustments of the machine.

The cutting tool 5 is moved across the face of the work by the threaded shaft 41 which is threadedly positioned in the base of the slide 35. The shaft 41 is rotated by the ratchet 42 through the reciprocating action of the pawl 43 which is moved a definite amount with each revolution of the crank disc 24 through the action of the cam lug 44 formed on the periphery of the crank disc coming in contact with the cam follower 45. The pawl 43 is connected with and moved by the cam follower 45 through the lever 46, shaft 47 and lever 48. A suitable spring 49 is used to keep the cam follower 45 in constant engagement with the periphery of the crank disc 24. The slide 35 may be manually adjusted in the slide 36 by the hand lever 51 mounted on the outer end of the threaded shaft 41 to move the cutting tool back to its starting position after it has been fed across the face of the work.

The slide 38 is adjustable longitudinally of the slide way 39 through the threaded shaft 50 and hand lever 52. The slide way 16 is carried by the support 53 formed on the slide 38 and is thereby moved by the hand lever 52 to vary the positions of the pivots 37 and 14 which will simultaneously move to the centers of the curves which are to be formed in each meridian of the work, particularly when adjusted for spherical curves. To feed the work 2 into the cutting tool 5 and to determine the amount that is to be removed by the cutting tool the radius bar 3 is provided with the threaded portion 54 threadedly positioned in the pivoted support 14 and has a hand lever 55 at the opposite end with which the radius bar 3 may be rotated to move the work 2 towards or away from the cutting tool 5. The radius bar 3 is rotatively positioned in the slide 9 and is held against longitudinal movement therein by the collars or the like 57.

The perforated lugs 58, 59 and 60 formed on the slide and slide ways 32, 33 and 35 are adapted to receive the aligning pin 61 which automatically aligns the pivots 31 and 34 together with the slide and slide ways 32, 33 and 35 and holds the same in aligned position during the adjustment of the machine for the various curves to be formed so that a quick and accurate adjustment may be made. All adjustments are made from this predetermined position.

To facilitate the adjustment of the cutting tool and have a given point to work from there is provided a gauge member 62 having the recessed end 63 adapted to be positioned on the upstanding lug 64 formed on the end of the pivot 31. This gauge member is formed with the face 71 which is adapted to align itself with the center line of the pivot 31 so that the point of the cutting tool 5 may be brought into contact with the face 71 and be accurately positioned with respect to the pivot. This allows the turrets 1 and 4 to be reversed as shown in Figs. 2 and 3 so that a concave or convex lap may be formed without changing the adjustment of the curves.

The spring pressed pins 65 which are positioned in the openings 66 are used to locate and lock the turrets in either of the reversed positions. The radius bar 6 is provided with the threaded end 67 threadedly connected to the slide 32 so that it may be quickly attached to or detached from the slide 32.

The operation of the machine is as follows: power is applied to reciprocate the slide 12 in the slide way 13 through the crank lever 21 and the crank disc 24 which is driven through the gears 28 and 29 by the motor or the like 27. The work 2 being pivotally supported by the slide 12 is moved upwardly and downwardly during the reciprocation of the slide and it will be noted that as this movement takes place the work 2 through its connection with the radius rod 3 will be moved about an arc drawn from the center of the pivot 14 to the point of the cutting tool 5 through the action of the slide 9 and the pivot 11. This forms the cutting stroke of the machine and also forms the curve desired in one meridian of the work. To simultaneously feed the cutting tool across the face of the work to form the curve in the other meridian the crank disc 24 is provided with the cam lug 44 adapted to operate the pawl 43 which rotates the ratchet 42 and shaft 41 a definite amount at each revolution of the disc 24. This intermittently feeds the cutting tool 5 across the face of the work 2 and simultaneously forms the curve in the other meridian of the work by the sliding action and pivotal movement of the cutting tool support 30 which is moved in an arc through its connection with the radius rod 6.

The curve formed by the cutting tool 5 is equal to a radius from the center of the pivot 37 to the point of the tool. A concave or convex lap of equal dimensions may be formed by simply reversing the turrets 1 and 4 as shown in Figs. 2 and 3 without resetting or readjusting the machine. This may be done when any type of lap is being formed as the cutting point of the tool is always tangent to the center line of the pivot 31 and never changes its position. To form a spherical curvature the turrets 1 and 4 are locked in aligned position by the pins 61 which are positioned in the lugs 58, 59 and 60 and the point of the cutting tool 5 is then adjusted to the center of the pivot 31 and locked in position. The pivot 14 is loosened and the slide 15 is adjusted until the indicator mark 19 is at zero on the graduated scale 20. The pivot 37 is then loosened and the slide 38 is adjusted until the indicator 68 is aligned with the graduations on the scale 69 to select the curve desired. The pivots 14 and 37 are then tightened, the pins 61 removed and power is applied to operate the machine.

It will be noted that the curves in both meridians are equal and are both adjusted simultaneously and thereby form a spherical curvature. To form a toric curvature, that is, a surface having a different curvature in the two major meridians, the machine is adjusted in a similar manner as for the spherical curvature only in this instance the curve in one meridian is selected from the scale 69 and the curve in the other meridian from the scale 20. The increase or decrease of one curve from the other is controlled by the slide 15 which may be moved longitudinally of the slide way 16 to vary the position of the pivot 14 and select the curve desired in that meridian.

To form a cylindrical surface the turrets 1 and 4 are locked in alignment and the machine is adjusted as previously stated, only in this instance the radius rod 6 is disconnected and the pin 61 is left in the lugs 58, 59 and 60 in the turret 4 during the forming of the lap. This causes the cutting tool 5 to travel in a straight line and therefore forms a curve in only one meridian or in the meridian of the cutting stroke of the machine. The curve formed in this meridian is controlled by the slide 15 and gauge 20.

To feed the lap 2 into the cutting tool 5 and to determine the amount to be removed from the face of the lap by the cutting tool, there is provided a hand lever 55 attached to the end of the radius rod 3. The radius rod 3 is threaded into the pivoted support 14 and thereby adjusts the lap 2 toward or away from the cutting tool 5 when the lever 55 is rotated.

From the foregoing description it will be seen that simple, durable and efficient means have been provided whereby any type of lap may be trued with a great saving in time and labor in the selection of the curves desired and that I have provided means whereby the machine may be quickly reversed to form either a concave or a convex tool without disturbing the adjustments of the curves to be formed on the face of the work.

Having described my invention, I claim:

1. In a device of the character described in combination with a surfacing tool, radius adjusting means to cause the surfacing tool to move in an arc about a fixed center, a work holder having means to hold the work in operative relation to the tool, radius adjusting means to cause the work holder to move in an arc about a fixed center in a plane at right angles to the plane of the arc of the tool, and means adapted to move both radius adjusting means longitudinally at the same time.

2. In a device of the character described, in combination with a surfacing tool, a rotatable support for the tool, radius adjusting means for moving the support in an arc about a fixed center, a rotatable work holder having means for holding the work in operative relation with the tool, radius adjusting means for moving the work holder in an arc about a fixed center in a plane at right angles to the plane of the arc of the tool, and slide means adapted to move both radius adjusting means longitudinally at the same time.

3. In a device of the character described in combination with a surfacing tool, a support for the surfacing tool, a pair of double slides movable at right angles to each other and supporting and carrying the tool support, a radius rod connected to one of the double slides, a work holder having means for holding the work in operable relation with the tool, a pair of double slides movable at right angles to each other and supporting and carrying the work holder, a radius rod connected to one of the double slides for the work holder and a slide having radius rod clamping means adapted to clamp each of the radius rods at desired positions to fix the radii of the arcs in which the tool support and the work holder will move on their double slides, the sets of double slides being in planes at right angles to each other.

4. In a device of the character described in combination with a tool, a radius rod for moving the tool in an arc, a work holder having means to hold the work in operative relation to the tool, a radius rod for moving the work in an arc in a plane at right angles to the plane of the arc of the tool and a single slide having clamping members adapted to clamp both the radius rods thereon at desired positions to fix the radii of the arcs in which the tool and work holder will move respectively.

5. In a device of the character described in combination with a tool, a radius rod for moving the tool in an arc, a work holder having means to hold the work in operative relation to the tool, a radius rod for moving the work holder in an arc in a plane at right angles to the plane of the arc of the tool and a single slidable member having clamping members adapted to clamp each radius rod to fix the radii of the arcs in which the tool and work will move, and a slide member on the first slide carrying one of the said clamps.

6. In a device of the character described in combination with a tool, a tool holder, a double slide having members slidable at right angles to each other and supporting and carrying the tool holder, a support for the double slide, said double slide members and the slide support having aligned openings when the double slide is initially set for the curvature of the work, and locking means extending through the aligned openings to hold the said parts in alignment when setting the tool for the initial cut.

7. In a device of the character described in combination with a surfacing tool, means to move the tool in an arc about a fixed center, a work holder having means to hold the work in operative relation to the tool, means to move the work holder in an arc about a fixed center in a plane at right angles to the plane of the arc of the tool, single slide means for regulating the radii of the two arcs simultaneously, and additional means slidable on the single slide means for changing the position of the center of one of the arcs with respect to the center of the other arc.

8. In a device of the character described in combination with a surfacing tool, means to move the tool in an arc about a fixed center, a work holder having means to hold the work in operative relation to the tool, means to move the work holder in an arc about a fixed center in a plane at right angles to the plane of the arc of the tool, single slide means for regulating the radii of the two arcs simultaneously, means slidable on the first slide means for changing the position of the center of one of the arcs with respect to the center of the other arc, and means for changing the relation of the tool and work holder to provide for the cut on the work without changing the radius of the curve being cut.

9. In a device of the character described in combination with a surfacing tool, means to move the surfacing tool in an arc about a fixed center, a work holder having means to hold the work in operative relation to the tool, means to move the work holder in an arc about a fixed center in a plane at right angles to the plane of the arc of the tool, single slide means for regulating the radii of the two arcs simultaneously, and means for changing the relation of the tool and work holder to provide for the cut on the work without changing the radius of the curve being cut.

10. In a device of the character described in combination with a tool, means to move the tool in an arc about a fixed center, a work holder having means to hold the work in operative relation with the tool, means to move the work holder in an arc about a fixed center in a plane normal to the plane of the arc of the tool, and means for locking the work holder and tool against movement in said arcs and allow them to travel in straight lines in the same plane and direction as they are moved to produce the curve of the arc.

11. In a device of the character described, a tool support table, a radius rod engaging the tool support table adapted to regulate the arc of travel of said support, a tool holder pivoted on the table, a work support table, a radius rod engaging the work support table and adapted to regulate the arc of travel of said table both radius rods being secured to relatively fixed centers to move the tables as they are reciprocated by operating means and a work holder pivoted on the work support table, the axes of the two pivots being at right angles to each other and lying in a common plane whereby the tool and the work may be rotated by movement on their pivotal supports so that a concave curve or a convex curve may be shaped on the work to the radius to which the radius rod is set.

12. In a device of the character described in combination with a surfacing tool, a support for the surfacing tool, means movable at right angles to each other and supporting and carrying the tool support, radius regulating means connected to one of said movable means, a work holder having means for holding the work in operable relation with the tool, means movable at right angles to each other and supporting and carrying the work holder, radius regulating means connected to one of said movable means, and movable means having engaging means to engage each of the radius regulating means at desired position to fix the radii of the arcs in which the tool support and the work holder will move on their movable supports, said movable supports being in planes at right angles to each other.

13. In a device of the character described in combination with a tool, a radius rod for moving the tool in an arc, a work holder having means to hold the work in operable relation to the tool, a radius rod for moving the work holder in an arc in a plane at right angles to the plane of the arc of the tool, a pair of clamps adapted to clamp the radius rods to fix the arcs of the movements of the tool and work holder members, a slide member carrying one of the clamps, said slide member sliding on a support carrying the other clamp.

14. In a device of the character described in combination with a workholder, means to move the workholder in an arc about a fixed center, a surfacing tool held in operative relation to the workholder, means to move the tool in an arc about a fixed center in a plane normal to the plane of the arc of the workholder, and means to lock the tool against movement in said arc and allow it to travel in a straight line in the same plane and direction as it is moved to produce the curve of the arc.

15. In a device of the character described in combination with a tool, means to move the tool in an arc about a fixed center, a workholder having means to hold the work in operative relation with the tool, means to move the workholder in an arc about a fixed center in a plane normal to the plane of the arc of the tool, and means to lock the workholder against movement in said arc and allow it to travel in a straight line in the same plane and direction as it is moved to produce the curve of the arc.

16. In a device of the character described in combination with a surfacing tool, a support for the surfacing tool, means movable at right angles to each other and supporting and carrying the tool support, radius regulating means connected to one of said movable means, a work holder having means for holding the work in operable relation with the tool, means movable at right angles to each other and supporting and carrying the work holder, radius regulating means connected to one of said movable means, a movable member having engaging means to engage the radius regulating means at desired position to fixed the radii of the arc in which the tool support will move on its movable support and a movable member having engaging means to engage the radius regulating means at desired position to fix the radii of the arc in which the work support will move its movable support.

17. In a device of the character described in combination with a surfacing tool, a support for the surfacing tool, slide means movable at right angles to each other and supporting and carrying the tool support, radius regulating means connected to one of said slide members, a work holder having means for holding the work in operable relation with the tool, second slide means movable at right angles to each other and supporting and carrying the work holder, radius regulating means connected to one of said slide members, a third slide member having engaging means to engage the radius regulating means at desired position to fix the radii of the arc in which the tool support will move on its movable support and a fourth slide member having engaging means to engage the radius regulating means at desired position to fix the radii of the arc in which the work support will move on its movable support.

18. In a device of the character described, means for pivotally supporting a tool, a pivoted work holder having means to hold the work in operable relation to the tool and means to impart motion to said tool support and work holder to cause the tool to produce a finished surface on the work, said tool support and work support being reversible on their pivots to change the position of the tool and work relative to each other, to produce either a concave or convex surface on the work without having to remove the tool or work from its support or having to alter any of the adjustments of the machine.

19. In a device of the character described, means for pivotally supporting a tool, a pivoted work holder having means to hold the work in operable relation to the tool and means to impart motion to said tool support and work holder to cause the tool to produce a curved surface on the work, said tool support and work support being reversible on their pivots to change the position of the tool and work relative to each other to produce either a concave or convex surface on the work without having to remove the tool or work from its support or having to alter any of the curve generating adjustments of the machine.

20. In a device of the character described, a double slide having a pivoted support for a tool, a double slide having a pivoted support having means thereon to hold the work in operable relation to the tool, means engaging one of the slide supports of the tool to control the path of movement of said tool, means engaging one of the slide supports of the work to control the path of movement of the work relative to the tool and means to impart motion to said tool support and work support to cause the tool to produce a finished surface on the work, said tool support and work support being reversible on their pivots to change the position of the tool and work relative to each other to produce either a concave or convex surface on the work without having to remove the tool or work from its support.

21. In a device of the character described, a double slide having a pivoted support for a tool, a double slide having a pivoted support having means thereon to hold the work in operable relation to the tool and means to impart motion to said tool support and work holder to cause the tool to produce a finished surface on the work, means engaging one of the slide supports of the tool to control the movement thereof, means engaging one of the slide supports of the work to control the movement thereof relative to the tool, means engaging the attached controlling means of the tool support wherein said attached controlling means may be adjusted to the curve desired and means engaging the attached controlling means of the work support wherein said attached controlling means may be adjusted to produce the desired curve in the opposite meridian of the work, said tool support and work support being reversible on their pivots to change the position of the tool and work relative to each other to produce either a concave or convex surface on the work without having to remove the tool or work from its support.

22. In a device of the character described in combination with a work holder, a surfacing tool held in operative relation to the work holder, means to move the tool and work in an arc about a fixed center at right angles to each other and means for disengaging the arc generating means from either the tool or work holder to allow one of said members to move in a straight line in a plane normal to the path of movement of the opposite member.

23. In a device of the character described, a slide, a work holder mounted on the slide, a second slide member, a surfacing tool mounted on the second slide member in operative relation to the work holder, means engaging the tool and work support to move the tool and work in an arc about a fixed center at right angles to each other and means for disengaging the arc generating means from either the tool or work holder to allow one of said members to move longitudinally of the slide in a straight line in a plane normal to the path of movement of the opposite member.

WILLIAM A. GUNNING.